Oct. 8, 1957    D. M. STRASSER ET AL    2,809,104
GASIFICATION OF LIQUID FUELS
Filed July 22, 1955
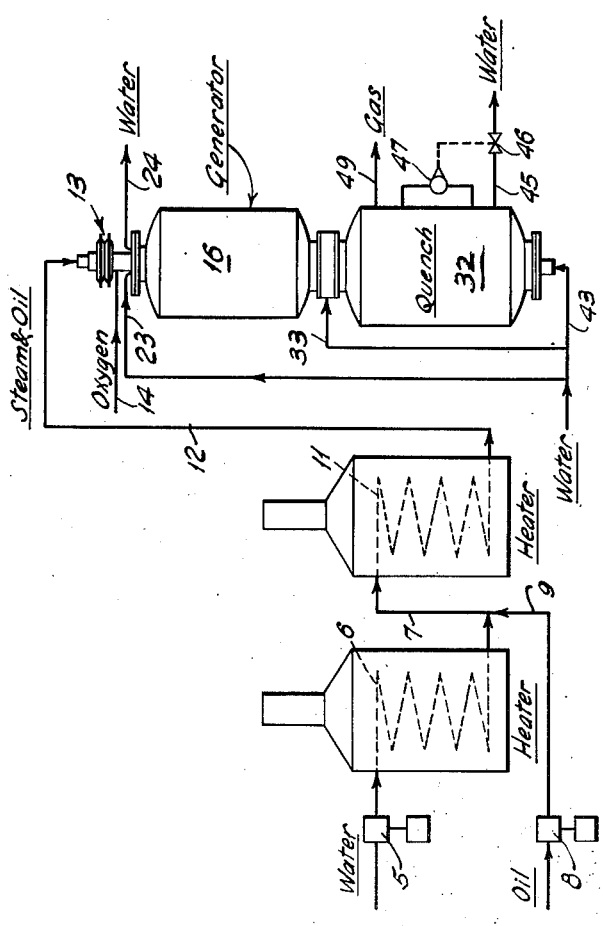

United States Patent Office 2,809,104
Patented Oct. 8, 1957

2,809,104

GASIFICATION OF LIQUID FUELS

Dale M. Strasser, Amarillo, Tex., and Frank E. Guptill and Charles P. Marion, Whittier, Calif., assignors to The Texas Company, New York, N. Y., a corporation of Delaware Application July 22, 1955, Serial No. 523,794

9 Claims. (Cl. 48—215)

The present invention relates to a process for the gasification of liquid fuels. The process is particularly useful for reaction of a heavy liquid hydrocarbon, for example, heavy petroleum residua and heavy crude oils, with steam and free oxygen to produce a mixture of gaseous products comprising carbon monoxide and hydrogen and useful, for example, as synthesis gas, fuel gas, or as a source of hydrogen for various purposes.

Hydrocarbons may be converted to carbon monoxide and hydrogen by reaction with steam alone or with a mixture of oxygen and steam. Generally with liquid hydrocarbons, the hydrocarbon is reacted with oxygen and steam at an elevated reaction temperature sufficient to convert the hydrocarbon substantially completely to fixed gases comprising mainly carbon monoxide and hydrogen. The partial oxidation of liquid hydrocarbons to form carbon monoxide and hydrogen, together with small amounts of carbon dioxide, light hydrocarbons and free carbon is known in the art. Ordinarily, oxygen and steam are mixed with an atomized spray of liquid fuel to form a mixture which is supplied to a reaction zone wherein the reaction is carried out at a temperature above about 1800° F.

In accordance with the present invention, the reactant mixture is prepared in a novel manner which has been found to produce superior results in the gasification of liquid hydrocarbons, particularly, heavy hydrocarbon oils, e. g. heavy crude oils or crude residua.

In the process of this invention, the heavy oil feed is injected into a stream of steam and the resulting mixture subjected to highly turbulent flow conditions. In a preferred embodiment, the mixture is passed through an elongated tubular zone under conditions of high velocity and highly turbulent flow. The high turbulence disperses the oil uniformly in the steam. The oil is generally substantially unvaporized or, at most, only partly vaporized. Apparently the highly turbulent flow disperses the liquid oil as very small particles uniformly in the steam forming a substantially homogeneous dispersion having the appearance of a mist.

Preferably, the steam is superheated prior to injection of the oil to a temperature such that there is substantially no condensation of the steam in the resulting steam-oil mixture. The oil may be preheated or at ambient temperature when injected into the stream of preheated steam. The dispersion is preferably formed by passing the oil-steam mixture through a relatively long tubular conduit at a velocity in excess of about 20 feet per second, preferably in excess of 30 feet per second. Lower velocities permit partial segregation of the oil, probably along the walls of the conduit, resulting in uneven flow of the dispersion, and pressure and flow rate fluctuations, or slugging, of the fuel feed to the generator which results in erratic operation of the generator. Preferably, the tubular section in which the dispersion of oil in steam is accomplished has a length at least 100 times the inside pipe diameter; advantageously, the mixing tube has a length at least 500 times its inside diameter. In a preferred embodiment, the tubular mixing zone is heated to a temperature above the temperature of the initial mixture of steam and oil so that the mixture is preheated during flow therethrough.

The preheated dispersion of oil in steam is passed directly into the reaction zone in which the partial oxidation reaction takes place. The preheated dispersion is preferably mixed with oxygen at the point of discharge into the reaction zone. In a preferred embodiment, the oil-steam dispersion is continuously discharged into the reaction chamber through a nozzle or orifice, and the oxygen stream is discharged from an adjacent orifice into impinging or mixing relationship with the steam-oil stream. A suitable mixer-burner is described in more detail hereinafter.

The reaction zone, for example, is maintained at a temperature within the range of about 1800 to 3500° F. at a level where the reaction goes rapidly to completion. For the production of carbon monoxide and hydrogen substantially completely free from methane the reaction is conducted at a temperature above about 2400° F. Freedom from methane is desirable when the product gases are used for the preparation of synthesis feed gas or for the production of high purity hydrogen for other purposes. When fuel gas is the desired product, the presence of methane is desirable. For the production of gas containing appreciable amounts of methane, a reaction temperature in the range of 1800 to 2200° F. is desirable.

The flow rates in all supply conduits between the point of oil injection and the burner feed orifice should be above about 20 feet per second and preferably above 30 feet per second so that the turbulence of flow is sufficient to maintain the high degree of dispersion of the oil in the steam at all times. The method of preparing a steam-oil dispersion as disclosed herein results in improved generator operation as compared with the conventional procedure of atomizing the oil into a stream of steam or atomizing the oil with steam within the burner. Apparently the highly turbulent flow which takes place in the tubing at velocities in excess of 20 feet per second results in better dispersion of oil in steam for this process than is possible in a spray-type atomizer. To avoid slugging and to insure a uniform dispersion, sufficient vapor, i. e. steam and vapor from the oil, must be present so that at least 70 percent by volume of the feed is in vapor form. Preferably, at least 90 mol percent of the oil-steam feed is in vapor form.

The preheated oil-steam dispersion discharged from the burner orifice into the high temperature zone apparently is an evenly dispersed, fog-like fluid phase, which mixes intimately with the oxygen stream and immediately reacts under the high temperature prevailing in the reaction zone. Reacting the uniform, highly attenuated, fog-like phase in this manner results in improved high carbon utilization, and increased efficiency from the standpoint of maximizing the conversion of the heavy oil feed into the desired reaction product gases.

In a preferred embodiment of the present invention, the oil-steam mixture initially formed is passed through a tubular heater under turbulent flow conditions to effect intimate mixing of the oil and steam and, at the same time, preheat the steam-oil mixture. In general, it is desirable to limit the amount of preheat to about 750° F. to prevent cracking of the oil. Alternatively, though less desirably, higher temperatures may be employed under which conditions some decomposition of the oil takes place. At temperatures on the order of 1200 to 1800° F., reaction takes place between the oil and steam to form carbon monoxide and hydrogen.

The relative proportions of steam and oil may vary over a wide range, for example, from about 0.2 to about 3 pounds of steam per pound of oil supplied to the reaction zone. The effectiveness of the degree of dispersion of the oil in steam varies little with the proportions of steam and oil within the above range. This is of particular advantage from the standpoint that the rate of steam fed to the reaction zone may be regulated exclusively on the basis of the operating requirements, and particularly the temperature which it is desired to maintain in the reaction zone.

The temperature in the reaction zone may be regulated within the desired limits by regulating the relative proportions of the oxygen, steam and oil supplied to the reaction zone. Since the reaction of steam with carbon from the oil is an endothermic reaction, increasing the proportion of steam in the feed tends to lower the reaction temperature. The reaction of oxygen with carbon or hydrogen from the oil is a highly exothermic reaction, particularly at elevated pressures. The presence of steam is, therefore, desirable to prevent excessive reaction temperatures. On the other hand, an excess of steam supplied to the reaction zone decreases the temperature below the effective reaction temperature and must be avoided.

In effecting the reaction at temperatures in the range of about 1800 to 3500° F., and at pressures of atmospheric or above, as for example 20 to 1000 p. s. i. with heavy residual oils, and the like, the steam required for holding the temperature in this range using sufficient oxygen for substantially complete consumption of the oil may vary between 20 and 300 percent, by weight, on the basis of the oil feed.

The present invention is, therefore, of obvious advantage in the regulated oxidation of liquid fuels and particularly heavy carbonaceous liquids, which are characteristically resistant to atomization, and thus difficult to place in optimum admixture with the oxidizing gas in a continuous process of this character. The heavy liquid hydrocarbons, for instance, inherently resist subdivision into particles of sufficient minuteness to permit optimum intimacy of contact with the other reactants. A number of expedients have been proposed to overcome this, as for example, the blasting of the feed oil by a flow of high velocity steam, oxygen, or various other materials. In each instance, however, the particles of oil thus formed lack the desired degree of subdivision, and, as a result, mix relatively poorly with the oxidizing agent in the reaction zone. Therefore, there is a substantial tendency for thermal or pyrolitic decomposition of the oil to precede chemical interaction of the several reactants, and accordingly their intended direct reaction to form the desired product gases is offset by a large measure by the cracking of the injected oil to form solid carbon.

The figure is a diagrammatic flow sheet representing an example of an arrangement of apparatus suitable for carrying out the process of this invention.

With reference to the drawings, water is introduced into the system by pump 5 into heating coil 6 where it is converted to steam. For the purposes of illustration, the embodiment will be described in terms of the generation of mixtures of hydrogen and carbon monoxide for use in the catalytic synthesis of hydrocarbons and oxygenated hydrocarbons. The steam produced in heater 6 is discharged through line 7. Liquid oil from a suitable source is pumped at a controlled rate by pump 8 through line 9 and injected into the stream of steam in line 7. Pumps 5 and 8 for water and oil, respectively, permit accurate proportioning of the steam and oil. The mixture of oil and steam, which at first is rather crude, is developed into an intimate dispersion of oil particles in steam by passage through a long tubular zone at relatively high velocity so that the highly turbulent flow thoroughly and evenly disperses the oil droplets in the steam. In the example illustrated in the figure, the steam-oil mixture passes through a tubular heater 11. The oil is continuously injected into the stream of steam in desired proportions and subjected in preheater 11 to a substantial increase in temperature not exceeding, however, the range of temperature at which the major portion of the oil remains in liquid form. Turbulent flow is maintained in the preheater, preferably in excess of 20 feet per second, as described above. The resulting heated steam-oil dispersion passes through line 12 to burner 13 where it is mixed with oxygen from line 14 and discharged directly into gas generator 16.

The generator 16 comprises a pressure vessel 28 provided with a suitable refractory and heat insulating lining enclosing a compact, unpacked reaction chamber. Products of reaction flow into a quench vessel 32 comprising a pressure vessel containing water and operated at substantially the generator pressure.

The hot product gases leaving generator 16 are continuously contacted with a spray of quench water supplied through line 33.

Additional quench water, i. e. water in addition to that supplied through line 33, may be introduced into the quench vessel through line 43. Water is drawn from the quench vessel as required through line 45, controlled by valve 46 in response to liquid level controller 47, to maintain the desired liquid level in the quench vessel.

The cooled product gas is withdrawn through line 49.

As described above, a highly dispersed phase of oil in steam may be produced simply by bringing together the oil and steam, e. g. by injecting the oil into a stream of steam, and subjecting the mixture to turbulence, most suitably by passing the mixture at high velocity through a tubular conduit. In some instances, e. g. in those instances in which a low water-oil feed ratio is employed for the gas generation, it may be advantageous to atomize the oil into the stream of steam followed by turbulent flow through a tubular conduit. A suitable method of atomizing the oil comprises flowing the oil into a high velocity annular stream of steam. Preferably, the steam velocity for atomization in a device of this type is such that the relative velocity between the steam and oil is greater than 400 feet per second. Alternatively, a high pressure atomizing nozzle may be employed to spray the oil directly into the steam at a point in the system where the steam velocity is 20 feet per second or higher.

As indicated above, the oil injected into the stream of steam may or may not be preheated, as desired. In a preferred example described above, the oil is at ambient temperature or is preheated only moderately prior to injection into the steam, and the mixture of oil and steam is passed through a preheater. Alternatively, but less desirably, the oil may be heated to a temperature as high as possible before introduction into the steam. The upper limit of the oil preheat temperature is generally limited by cracking of the oil with resultant coking and plugging of the preheater coil. Permissible oil preheat temperatures vary, depending on the character of the oil feed stock, and may be readily determined for any given feed stock.

A series of comparative runs on synthesis gas generation were carried out at temperatures in the neighborhood of 2400° F. In two of the runs, A and B, the oil was atomized in a conventional swirl-type spray nozzle into a high velocity annular stream of steam and oxygen. In the other two runs, C and D, oil was injected into a stream of steam and the dispersion fed to the generator as described above. In all of the runs, heavy oil was used. In runs A and B, the oil had an API gravity of 16.4; in runs C and D, the oil had an API gravity of 8.6. The heavier oil in runs C and D is more difficult to atomize than is the oil used in runs A and B. In the case of runs A and B, the fuel was preheated to a temperature of about 400° F. to reduce its viscosity prior to injection through the spray nozzle. In runs C and D, the oil was pumped without preheating directly into a stream of superheated steam. Runs A and B were terminated after periods of a few hours each due to failure of the burners. The burner used for runs C and D remained in good condition throughout several runs. In spite of the use of less viscous oil in runs A and B and preheating to reduce its viscosity, the results were not as good as for runs C and D either with regard to continuity of operation or extent of carbon conversion.

The following table lists pertinent data for the several runs:

|  | A | B | C | D |
|---|---|---|---|---|
| Temperature | 2,385 | 2,385 | 2,444 | 2,482 |
| Pressure | 200 | 200 | 339 | 338 |
| Water Rate, #/bbl. oil | 161 | 310 | 264 | 209 |
| Carbon Make, #/bbl. oil | 29.3 | 22.5 | 7.5 | 10.1 |
| Product Gas Composition (mol percent dry basis): |  |  |  |  |
| Carbon monoxide | 43.9 | 41.5 | 42.9 | 45.6 |
| Carbon dioxide | 5.9 | 8.6 | 7.1 | 6.4 |
| Hydrogen | 49.1 | 48.9 | 49.5 | 47.4 |
| Nitrogen | 0.5 | 0.2 | 0.1 | 0.2 |
| Methane | 0.4 | 0.5 | 0.1 | 0.2 |
| Carbonyl sulfide and Hydrogen sulfide | 0.2 | 0.3 | 0.4 | 0.2 |

It is evident from the foregoing table that superior results were obtained with the method of forming the steam-oil dispersion as disclosed in this application over the conventional spray nozzle burners. This is particularly evident by the reduction in free carbon in the product. Even the high steam rate in run B failed to compensate for the poorer operation of the atomizing burner as compared with the method of oil feed disclosed herein.

Although the description of the invention refers to oil only as fuel, it is to be understood that the oil feed may be supplemented with other fuels, e. g. a fuel gas or pulverized solid fuel, as required. Pulverized solid fuel may be mixed with the oil prior to injection into the stream of steam. When gas, e. g. natural gas, is used as a supplemental fuel, the gas is preferably mixed with the steam.

In addition to its foregoing advantages, the present invention also is beneficial in overcoming the clogging tendency at the burner nozzle of the oil jet which characterizes ordinary operation. This follows from the fact that excessive pressure drops at the oil orifice of the burner tip are no longer necessary to break up and atomize oil. Therefore, it is permissible to enlarge the orifice sufficiently so that it is no longer clogged by particles of solid carbon whether in the feed oil or formed at the nozzle during operation, or formed about the nozzle by dripping during shut-down.

As previously indicated, the invention is not necessarily limited to the production of synthesis gas as in the foregoing example, but is also applicable to the production of desired gases containing various proportions of $H_2$, $CO$, $CO_2$, $N_2$ and the like. As is known, the nitrogen may be introduced by supplying air or oxygen-enriched air instead of pure oxygen.

The process of this invention is particularly useful for the gasification of heavy oils, e. g. oils having an API gravity of 20° or heavier. These oils are particularly difficult to atomize or to disperse in other reactants to form a homogeneous mixture by ordinary means. The process is also useful for gasification of lighter oils, e. g. oils of 35° API gravity or heavier. In general, the method of this invention gives superior results for the dispersion in steam of those oils a major portion of which is unvaporized in the dispersion.

Obviously, many modifications and variations of the invention as hereinbefore set forth may be made without departing from the spirit and scope thereof and, therefore, only such limitations should be imposed as are indicated in the appended claims.

We claim:

1. In a process for reacting a hydrocarbon oil with oxygen and steam in predetermined proportions to produce a mixture of gaseous products of partial combustion of said oil, the improvement which comprises introducing said oil in liquid form into a stream of steam, subjecting the resulting mixture of oil and steam to highly turbulent flow by passage of said mixture at a velocity in excess of 20 feet per second through a tubular zone having a length at least 100 times its inside diameter effecting intimate dispersion of the oil in steam while maintaining the major portion of the oil in liquid phase, introducing said dispersion, at a velocity in excess of about 20 feet per second into a reaction zone into intimate admixture with oxygen, and effecting said partial combustion at a temperature within the range of from about 1800 to about 3500° F.

2. A process as defined in claim 1 wherein the amount of steam employed is within the range of from about 20 to about 300 percent by weight of the weight of the oil.

3. A process as defined in claim 1 wherein the dispersion of steam and oil is developed by highly turbulent flow of the mixture under a pressure within the range of 50 to 1500 pounds per square inch and a temperature in the range of 300 to 1000° F. and above the temperature required to maintain the steam in vapor phase at the existing pressure.

4. A process as defined in claim 1 wherein said steam is in a superheated state prior to the addition of oil thereto.

5. A process as defined in claim 4 wherein the mixture of steam and oil contains no liquid water.

6. A process as defined in claim 1 wherein the mixture of steam and oil contains at least 70 mol percent vapor.

7. A process as defined in claim 1 wherein said oil is preheated to an elevated temperature in the range of 300 to 700° F. prior to introduction into said stream of steam.

8. A process as defined in claim 1 wherein fuel gas is admixed with said stream prior to introduction of said oil thereto.

9. A process according to claim 1, in which said mixture of oil and steam is subjected to heating in at least a portion of said tubular zone prior to introduction of said dispersion into said reaction zone.

References Cited in the file of this patent
UNITED STATES PATENTS

| 2,605,178 | Hemminger | July 29, 1952 |
| 2,698,830 | Jenney | Jan. 4, 1955 |
| 2,707,147 | Shapleigh | Apr. 26, 1955 |